United States Patent
Tanneau

(10) Patent No.: US 9,788,265 B2
(45) Date of Patent: Oct. 10, 2017

(54) METHOD OF MANAGING ACCESS OF AN UPLINK CHANNEL IN A TELECOMMUNICATION NETWORK INFRASTRUCTURE, COMPUTER PROGRAM, AND ELECTRONIC MODULE FOR IMPLEMENTING SAID METHOD

(71) Applicant: AIRBUS DS SAS, Elancourt (FR)

(72) Inventor: Lannig Tanneau, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 175 days.

(21) Appl. No.: 14/952,290

(22) Filed: Nov. 25, 2015

(65) Prior Publication Data

US 2016/0157166 A1 Jun. 2, 2016

(30) Foreign Application Priority Data

Nov. 28, 2014 (FR) ..................................... 14 02695

(51) Int. Cl.
*H04L 12/42* (2006.01)
*H04W 48/16* (2009.01)
(Continued)

(52) U.S. Cl.
CPC ........... *H04W 48/16* (2013.01); *H04L 5/0053* (2013.01); *H04W 72/0413* (2013.01); *H04W 72/0446* (2013.01); *H04W 74/0833* (2013.01)

(58) Field of Classification Search
CPC ................. H04L 2012/5675; H04J 2203/0091
See application file for complete search history.

(56) References Cited

U.S. PATENT DOCUMENTS

| | | | | |
|---|---|---|---|---|
| 7,457,307 | B1* | 11/2008 | Chien | ............... H04W 74/0816 370/445 |
| 2013/0128781 | A1* | 5/2013 | Li | ......................... H04W 56/00 370/280 |

(Continued)

FOREIGN PATENT DOCUMENTS

| EP | 0 418 865 A2 | 3/1991 |
|---|---|---|
| EP | 0 917 317 A1 | 5/1999 |

OTHER PUBLICATIONS

Search Report as issued in French Patent Application No. 1402695, dated Sep. 25, 2015.

*Primary Examiner* — Alvin Zhu
(74) *Attorney, Agent, or Firm* — Pillsbury Winthrop Shaw Pittman LLP

(57) ABSTRACT

Method for managing the accessibility of an uplink channel, of the control channel and/or data channel type, for a communications network infrastructure with a plurality of pieces of radio equipment (SU1; SU2; SU3), in which the accessibility to the uplink channel is transmitted on a downlink channel of the network infrastructure to the pieces of radio equipment by means of status symbols indicating if access to the uplink channel is authorized during a timeslot. The method comprises: a receiving of a message on the uplink channel coming from a piece of radio equipment (SU1), the message comprising an indicator in order to indicate a length type of the message; a reading of the indicator indicating the type of length and when the message is of the long type: a determining of the length L of the message received using a processing of a header block; a determining of the number Nb of subsequent timeslots corresponding to the determined length L, and a modification of at least one status symbol of the Nb subsequent timeslots determined.

14 Claims, 4 Drawing Sheets

(51) Int. Cl.
  *H04W 74/08*  (2009.01)
  *H04L 5/00*  (2006.01)
  *H04W 72/04*  (2009.01)

(56) References Cited

U.S. PATENT DOCUMENTS

2015/0341927 A1* 11/2015 Wei .................... H04W 72/0446
                                                                                      370/280
2016/0227491 A1* 8/2016 Park .................... H04W 52/325

\* cited by examiner

METHOD OF MANAGING ACCESS OF AN UPLINK CHANNEL IN A TELECOMMUNICATION NETWORK INFRASTRUCTURE, COMPUTER PROGRAM, AND ELECTRONIC MODULE FOR IMPLEMENTING SAID METHOD

CROSS-REFERENCE TO RELATED APPLICATIONS

This application claims priority to French Patent Application No. 1402695, filed Nov. 28, 2014, the entire content of which is incorporated herein by reference in its entirety.

FIELD

The invention relates to the field of digital radio equipment. More precisely, it relates to the field of random access radio equipment, in opposition to deterministic access methods, on data and/or control channels.

PRIOR ART

A control channel (CCH) designates a channel for exchanging signalling information between a network infrastructure and radio equipment. A data channel (DCH) designates a data exchange channel between the network infrastructure and the radio equipment.

The data channels and control channels are comprised of consecutive microslots.

A microslot corresponds to a duration that is the minimum time element for the downlink and uplink channels. The data channels and control channels are formed by the downlink and uplink channels.

Each microslot comprises a series of symbols. The first symbol of each microslot of the downlink channel is a status symbol that informs the radio equipment about the accessibility of the uplink channel during this microslot.

Most of the messages transmitted over the uplink channels of the CCH and/or DCH type have a length that corresponds to a defined number of microslots. It therefore seems easy for a network infrastructure to manage the accessibility on the uplink channel by allowing random access every x microslots, x microslots constituting a timeslot and having to be longer than the message to be transmitted. The number x is defined in such a way as to allow the radio equipment to receive and to process the accessibility information of the uplink channel, information carried by the status symbol, then to access the uplink channel in order to transmit a message before the appearance of the status symbol on the following timeslot.

Between two status symbols that inform that the access is idle on the uplink channel, i.e. between two timeslots, the information, i.e. the status symbols, must indicate that the random access is not authorised on the uplink channel.

This regular (periodical and static) transmission of the status symbols operates correctly when the messages to be transmitted by the radio equipment have a shorter length than the length of a timeslot. When messages to be transmitted are longer than the length of a timeslot, there could be more collisions on the uplink channel. With short messages, there are collisions when two terminals want to access the uplink channel at the same time. Indeed, the network could indicate that a random access is authorised on the uplink channel even if there is still a transmission on the uplink channel due to the message that is longer than expected.

It is desirable to overcome this problem and to propose a method for managing (dynamically) the accessibility of the uplink channel for a channel of the CCH and/or DCH type.

DISCLOSURE

An aspect of the invention has for purpose to reduce the number of possible collisions on an uplink channel of a control channel or of a data channel wherein the access of the radio equipment is done randomly.

Such a purpose is achieved with a method for managing the accessibility of an uplink channel, of the control channel and/or data channel type, for a communications network infrastructure with a plurality of pieces of radio equipment, wherein the accessibility to the uplink channel is transmitted on a downlink channel of the network infrastructure to the pieces of radio equipment by means of status symbols indicating if access to the uplink channel is authorised during a timeslot. The denomination of radio equipment is used to designate a radio unit, fixed, mobile, or portable.

According to an embodiment of the invention, the method comprises:
  a receiving of a message on the uplink channel coming from a piece of radio equipment, the message comprising an indicator in order to indicate a length type of the message,
  a reading of the indicator indicating the type of length and when the message is of the long type:
    a determination of the length of the message received using a processing of a header block,
    a determination of the number of subsequent timeslots corresponding to the determined length, and
    a modification of at least one status symbol of the Nb subsequent timeslots determined.

A method for the dynamic management of the accessibility of the uplink channel for a channel of the CCH and/or DCH type is thus proposed.

The message on the uplink channel is said to be a short message if the indicator indicates a short length type. The message is said to be long if the indicator indicates a long length type. The indicator called data Unit ID portion (DUID) defined by the communication standard P25 can for example be used. When a message is a short message, it does not have a header block. When a message is a long message, it has a header block.

According to an embodiment of the invention, the duration of a timeslot is set and defined by the network infrastructure.

The network infrastructure can indicate the duration of a timeslot on the control channel by a state every N status symbols, with the state being either idle in order to indicate to a piece of radio equipment that it can emit a message on the uplink channel, or busy or unknown in order to indicate to the piece of radio equipment that it cannot emit on the uplink channel, the N−1 interstitial status symbols indicating an unknown state. The value N can be determined by the network infrastructure according to the duration of a timeslot.

Alternatively, the duration of a timeslot is variable and dynamically modified by the network infrastructure.

The method according to an embodiment of the invention can comprise a step of calculating an end of reception of said message from the length of said message and a step of modifying the duration of the timeslot corresponding to the end of reception, in such a way as to begin a new timeslot immediately after the end of reception of said message.

The method according to an embodiment of the invention further comprises a sending by a piece of radio equipment of an uplink message that is longer than the duration of a timeslot, wherein the piece of radio equipment begins the emitting of the uplink message on a first timeslot and continues its emission on timeslots consecutive to the first timeslot.

The method according to an embodiment of the invention further comprises a step in which the network infrastructure is waiting for a message on the uplink channel. This uplink channel can be a control channel (CCH) or a data channel (DCH).

When the method according to an embodiment of the invention comprises the step in which the network infrastructure is waiting for a message on the uplink channel, the method can further comprise a step in which the network infrastructure receives at a timeslot Sj an uplink message D on the uplink channel.

According to an embodiment of the invention, the method further comprises a step in which the network infrastructure determines that the duration of the emission of the uplink message D is longer than the duration of the timeslot Sj. This step is optional.

In this same embodiment, the method further comprises a step in which the network infrastructure determines the number Nb of timeslots of duration S corresponding to the duration of the emission of the uplink message D.

In this case, the step of determining the number of timeslots can comprise a reading of the header block of the uplink message D indicating the length L of the uplink message, and using the knowledge of the uplink message length, a determination of the number Nb of timeslots of duration S corresponding to the emission of the uplink message D.

According to an embodiment of the invention, the method further comprises a step in which the network infrastructure modifies the state of the status symbols of as many timeslots consecutive to the reception timeslot as the number determined in the step of determining the number of timeslots, less 1, the state of the status symbol of the timeslots $S_{j+1}, \ldots, S_k$, with $k=j+Nb-1$, then being modified in order to indicate a busy state.

According to an embodiment of the invention, the step of determining the message length may be arranged in order to determine the length L of a message in a data protocol implementing a header block of which a field indicates the total length of the message.

According to an embodiment of the invention, the step of determining the message length may be arranged in order to determine the length L of the message divided into blocks, by reading a field within a header block.

According to an embodiment of the invention, the number Nb of timeslots of duration S corresponding to the duration of the emission of the message D is determined by calculating:

$$Nb = \left\lceil \frac{L/\Delta}{N*7.5} \right\rceil$$

where L is the length in bits of the message D, $\Delta$ the rate in bits per milliseconds of reception of this message, N the number of microslots per timeslot and 7.5 the duration in milliseconds of a microslot and where $\lceil x \rceil$ designates the integer greater than or equal to x.

According to an embodiment of the invention, the method can furthermore comprise a step in which a piece of radio equipment that has a message to be transmitted, receives a status symbol at idle state, then emits in the direction of the network infrastructure a message D1.

In this embodiment, the method further comprises more preferably a step in which the network infrastructure receives at the timeslot Sj the message D1 on the uplink channel.

According to an embodiment of the invention, the method can include a step in which the network infrastructure determines the number Nb of timeslots of duration S corresponding to the duration of the emission of the message D1 by determining the length L of the message.

According to an embodiment of the invention, the method further comprises a step in which the network infrastructure modifies the state of the status symbols of as many timeslots succeeding the reception timeslot as the number determined in the preceding step, less 1.

According to another aspect of the invention, it is proposed a communications network infrastructure with a plurality of pieces of radio equipment, implementing the method for managing accessibility according to the invention.

According to yet another aspect of the invention, it is proposed a computer programme implementing the method for managing accessibility according to an embodiment of the invention, the computer programme being installed in a physical subsystem of the network infrastructure such as a radio base station or a radio base station physical controller. The computer programme comprises one or more sequences of one or several machine-executable instructions and contained in a main memory in order to implement the method. The subsystem comprises electronic components required (for example, one or more microprocessors, one or several physical memories, bus, etc.) to implement the computer programme.

According to yet another aspect of the invention, it is proposed an electronic module implementing the method for managing accessibility according to the invention. The electronic module can be carried out in the form of a specialised (microelectronic) integrated circuit (ASIC module, for "Application-Specific Integrated Circuit").

BRIEF DESCRIPTION OF THE FIGURES

Other advantages and particularities of the invention shall appear when reading the detailed description of implementations and embodiments that are in no way limiting, and the following annexed drawings.

As these embodiments are in no way limiting, alternatives of the invention can in particular be considered (for example, by combining embodiments) comprising only a selection of the characteristics described below isolated from the other characteristics described (even if this selection is isolated within a sentence comprising these other characteristics), if this selection of characteristics is sufficient to confer a technical advantage or to differentiate the invention in relation to prior art. This selection comprises at least one characteristic more preferably functional without structural details, or with only a portion of the structural details if this portion only is sufficient to confer a technical advantage or to differentiate the invention in relation to prior art.

An element appearing in several figures retains the same reference in the figures.

The denomination "piece of radio equipment" (SU, for "Subscriber Unit") is used to designate a radio unit, fixed, mobile, or portable. A piece of radio equipment radio can send on a control channel uplink signalling messages of a minimum duration of 32.92 ms. Longer uplink messages exist.

DETAILED DESCRIPTION

Figure 1:
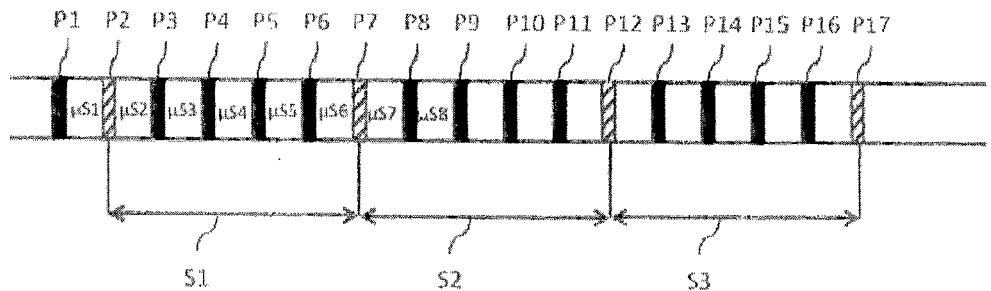
FIG. 1 is prior art showing a succession of status symbols.

FIG. 1 shows a succession of status symbols P1, ... P17, emitted by the network infrastructure. These status symbols are emitted every 7.5 ms, a period of time called microslot. Several microslots µS1, µS2, µS3, µS4, µS5, µS6, µS7, µS8 are shown in FIG. 1. The microslot µSi, with 1≤i≤I, is the time interval between the beginning of the status symbol Pi and the beginning of the next symbol.

Timeslots S1, S2, S3 are also defined, comprising an integer of microslots, five in the example in FIG. 1. In this case, the duration of a timeslot S1, S2, S3 is five times the duration of a microslot (5*7.5 ms) therefore 37.5 ms. It is in fact the minimum duration $T_{slot}$ of such a timeslot.

Indeed, the duration of a timeslot Sj, with 1≤j≤J, having to be greater than 32.92 ms as it is the duration of a short uplink message and the duration of a microslot being 7.5 ms, the minimum duration $T_{slot}$ of a timeslot Sj is indeed 37.5 ms, which corresponds to 5 microslots.

The duration of the timeslots Sj for a control channel is indicated by the status symbols in the downlink messages sent by the network infrastructure.

The timeslot duration Sj set by the network infrastructure is the result of the choice of radio equipment for this network. If the network is provided with a majority of equipment that is fast enough to adapt to timeslots of 37.5 ms, the network can be configured with timeslots of 37.5 ms in order to maximise the capacity of the control channel and of the data channel. However, if the pieces of radio equipment are slower and cannot all adapt to timeslots of 37.5 ms, then the system should be configured with timeslots of 45 ms in order to reduce the possible collisions between adjacent timeslots. There is a collision between two messages of radio equipment when at least two pieces of radio equipment access the uplink channel during the same timeslot. The duration of the timeslot is determined by the administrator of the network.

The network infrastructure indicates the duration of a timeslot Sj on the control channel by defining a specific state every N status symbols. The value of N is 5 for timeslots of 37.5 ms, 6 for timeslots of 45 ms, etc. This state is either idle, or busy. The intermediate status symbols indicate an unknown state.

The network infrastructure sets for each N-th status symbol an idle state on the control channel. This is the case, in FIG. 1, of status symbols P2, P7, P12, P17. The interstitial status symbols all indicate an unknown state. In this case, the management of the status symbols is regular and static.

Only a status symbol with an idle state indicates to a piece of radio equipment (SU) that it can emit a message on the uplink channel. The unknown and busy states prohibit a piece of radio equipment from emitting a message on the uplink channel. The radio equipment that wants to emit a message on the uplink channel must wait to receive a status symbol with an idle state in order to emit this message.

The duration of the timeslots Sj having been chosen to be greater than the maximum duration of the short uplink messages, an uplink message should not exceed the duration of a timeslot.

However, a piece of radio equipment can have to send a message long, i.e. longer than the length of a timeslot. In this case, the radio equipment begins its emission of the uplink message on a timeslot Sj and continues the emission of the uplink message over the timeslots Sj+1, Sj+2 . . . consecutive to the timeslot Sj.

In reference to FIG. 2 whereon all of the elements of the FIG. 1 are shown, only the addings and differences with FIG. 1 shall now be described.

During a first step, a radio equipment SU1 having a message to be transmitted, receives a status symbol P2 at idle state. The radio equipment SU1 emits in the direction of the network infrastructure the message D1. The message D1 here has a duration of emission greater than two timeslots.

During a step of receiving this message D1, and at the beginning of the latter, the network infrastructure determines that the duration of the emission of the message D1 is longer than the duration of the timeslot S1 because the message received is long. This is possible because the message D1 comprises an indicator in order to indicate a length type of said message, and a reading of the indicator indicates the type of length.

The message on the uplink channel is said to be a short message if the indicator indicates a short length type. The message is said to be long if the indicator indicates a long length type. This indicator is implemented over 4 bits in the standard P25, by implementing an indicator called data unit ID portion (DUID) which is a sub-portion of the network identifier (NID) encoded over 16 bits. Thus, the network infrastructure determines that the duration of the emission is longer than the duration of the timeslot (slot) S1.

Immediately after receiving and reading (i.e. decoding) the indicator, the network infrastructure modifies the state of the status symbol P7 of the timeslot consecutive to the timeslot S1, i.e. timeslot S2. The state of the status symbol P7 is modified in order to indicate a busy state.

Thus, another piece of radio equipment SU2 having an uplink message D2 to be transmitted receives a status symbol P7 at busy state at the beginning of the timeslot S2 and does not begin the emission but waits for the beginning of the next timeslot S3. This renunciation to emit the message D2 is illustrated by the dotted lines of the message D2.

The other radio equipment SU2 having the message D2 to be emitted, receives a status symbol P12 at idle state. Consequently, the other radio equipment SU2 emits in the direction of the network infrastructure the message D2.

One can notice that the reception of the message D1 by the network infrastructure enters into collision with the reception of the message D2. Indeed, the network infrastructure did not modify the state of the sub-symbol P12 which is normally busy.

Figure 2:
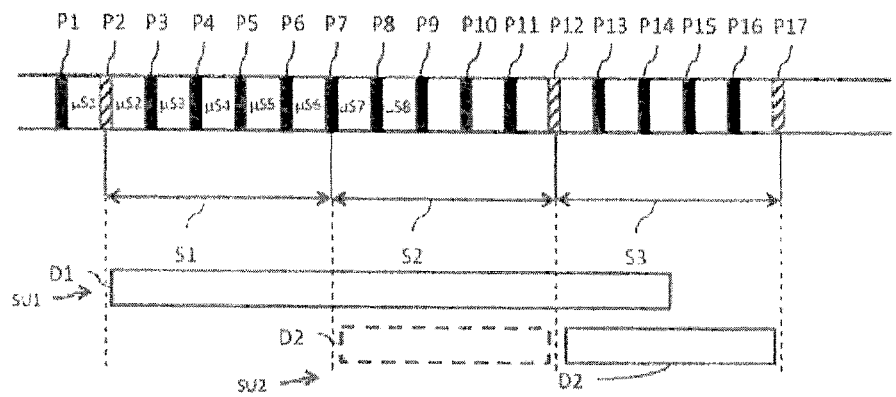
FIG. 2 shows a succession of status symbols modified by an uplink channel message D1.

Thus, the operation of FIG. 2 does not allow to avoid collisions, which are however foreseeable, when the message received by the network infrastructure is greater than twice the duration of a timeslot Sj.

Figure 3:
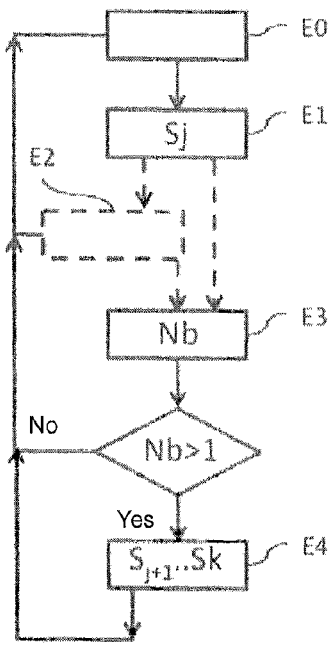
FIG. 3 shows the steps of a method for managing the accessibility of an uplink channel according to an embodiment of the invention.

FIG. 3 shows an embodiment of the method according to the invention implemented by the network infrastructure.

The network infrastructure initially defines for each N-th status symbol an idle state on the signalling channel, such as is described in relation with FIG. 1.

The method according to an embodiment of the invention is a method for managing the accessibility of an uplink channel, of the control channel and/or data channel type, for a communications network infrastructure with a plurality of pieces of radio equipment. The information on the accessibility to the uplink channel is transmitted on the downlink channel of the network infrastructure to the pieces of radio equipment by means of status symbols indicating if access to the uplink channel is authorised during a timeslot.

The duration of a timeslot is set by the network infrastructure.

The network infrastructure indicates the duration of a timeslot on the control channel by a state every N status symbols, with the state being either idle in order to indicate to a piece of radio equipment that it can emit a message on the uplink channel, or busy in order to indicate to the piece of radio equipment that it cannot emit on the uplink channel, the intermediate status symbols indicating an unknown state.

In the step E0, the network infrastructure is waiting for a message on the uplink channel, such as the control channel (CCH) or the data channel (DCH).

In the step E1, the network infrastructure receives at the timeslot Sj the message D coming from a piece of radio equipment on the uplink channel. The message D comprises an indicator of the length type, followed (if it is of the long type) by a header block. The method passes to the step E2, or to the step E3 if the step E2 is not implemented.

In the step E2, which is an optional step, the network infrastructure determines that the duration of the emission of the message D is longer than the duration of the timeslot Sj. To do this, the step E2 comprises a reading of the indicator of the message D indicating if the message on the uplink channel to follow is short or long, in relation to the duration of the timeslot Sj. If the message is short, the method terminates and return to the step E0, because the message can be emitted entirely in timeslot Sj without extending into timeslot Sj+1. There is therefore no risk of collision between a new message beginning in Sj+1 with the message D.

In the step E3, the network infrastructure determines the number Nb of timeslots of which the total duration is greater than or equal to the duration of the emission of the message D. To do this, the step E3 comprises a reading (i.e. decoding) of the header block of the message D indicating the length of the message. The knowledge of the length of the message makes it possible to determine the number of timeslots Nb of which the total duration is greater than or equal to the emission of the message D. If this number is 1, the method terminates and returns to the step EC).

Otherwise, at the step E4, the network infrastructure modifies the state of the status symbols of as many timeslots consecutive to the timeslot of reception as the number determined in the step E3, less 1. The state of the status symbol of the timeslots Sj+1 to Sk, with k=j+Nb−1, is modified in order to indicate a busy state.

As is said in the step E3, it is sometimes possible to directly determine the length of a message in certain data protocols, as the latter impose an indication in the header block of the length of the message. It is through analogy the case for the protocol IPv4 of which the third and fourth bytes of the header block indicate the total length of the message.

It is also sometimes possible to indirectly determine, as in the case with protocol P25, the length of all messages. Any long message is divided into blocks. Each long message comprises a header block (Hdr Block) comprised of 12 bytes. The byte numbered 6, the seventh, comprises the number of blocks to follow which specifies the number of blocks in the uplink message, without counting the header block. The length of the message D is thus deduced from this.

Knowing the length L of the message D, directly or indirectly, the number Nb is determined by calculating:

$$Nb = \left\lceil \frac{L/\Delta}{N*7.5} \right\rceil$$

where L is the length in bits of the message D, $\Delta$ the rate in bits per milliseconds of reception of this message, N the number of microslots per timeslot and 7.5 the duration in milliseconds of a microslot and where $\lceil x \rceil$ designates the integer greater than or equal to x.

Figure 4:
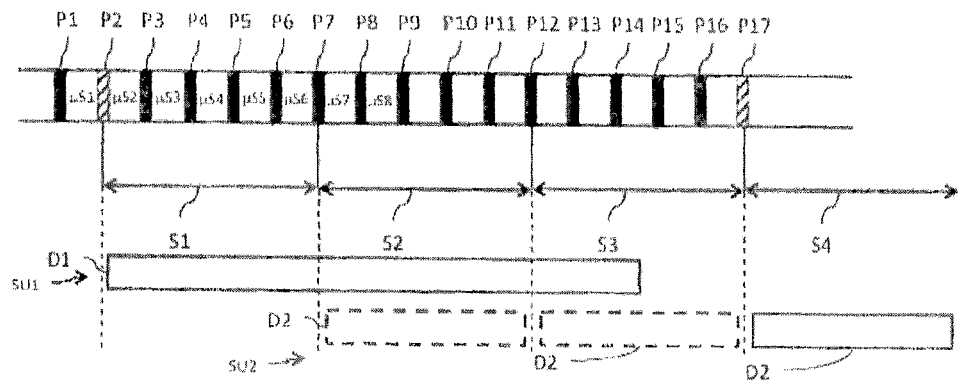
FIG. 4 shows a succession of status symbols modified by a first implementation of the method according to an embodiment of the invention.

FIG. 4 shows the result of an implementation by a network infrastructure of the method according to an embodiment of the invention wherein the optional step E2 is not implemented.

In reference to FIG. 4 wherein all of the elements of FIG. 1 are shown, only the addings and differences with FIG. 2 shall now be described. The steps are names in reference to FIG. 2.

During a first step E0, a piece of radio equipment SU1 having a message to be transmitted, receives a status symbol P2 at idle state. The radio equipment SU1 emits in the direction of a network infrastructure a message D1, this drives the passage of the method of the step E0 to the step E1.

In the step E1, the network infrastructure receives at the timeslot S1 the message D1 and activates the step E3 as the step E2 is not implemented in this example.

In the step E3, the network infrastructure determines according to the length of the message comprising the message D1 the number of timeslots Nb of which the total duration is greater than or equal to the duration of the emission of the message D1. In this example, the number Nb is equal to 3. The method then passes to the step E4.

In the step E4, the network infrastructure modifies the state of the status symbols by as many timeslots succeeding the reception timeslot as the number determined in the step E3, less 1. In this case, k=1+3−1=3. The state of the status symbol of the timeslots S2 to S3 is modified in order to indicate a busy state. In this example, these are the status symbols referenced as P7 and P12.

Thus, another piece of radio equipment SU2 that has the message D2 to be transmitted receives a status symbol P7 at busy state at the beginning of the timeslot S2 and does not begin the emission but waits for the beginning of the next timeslot S4. This renunciation to emit the message D2 is illustrated by the dotted lines of the message D2 in FIG. 4.

The radio equipment SU2 that has the message D2 to be emitted, receives a status symbol P12 at busy state at the beginning of the timeslot S3 and does not begin the emission but waits for the beginning of the next timeslot. This renunciation to emit the message D2 is illustrated by the dotted lines of the message D2 in FIG. 4.

Then the radio equipment SU2, that has the message D2 to be emitted, receives a status symbol P17 at idle state. Consequently, the radio equipment SU2 emits in the direction of the network infrastructure the message D2.

One can notice that the reception of the message D1 by the network infrastructure does not enter into collision with the receiving of the message D2.

Thus, the implementation of the method according to an embodiment of the invention allows to prevent foreseeable collisions, when the message received by the network infrastructure is greater than twice the timeslot duration S.

This is obtained thanks to the determining of the number Nb of timeslots impacted by the transmission of the message. This is possible by determining the length of the message.

Figure 5:
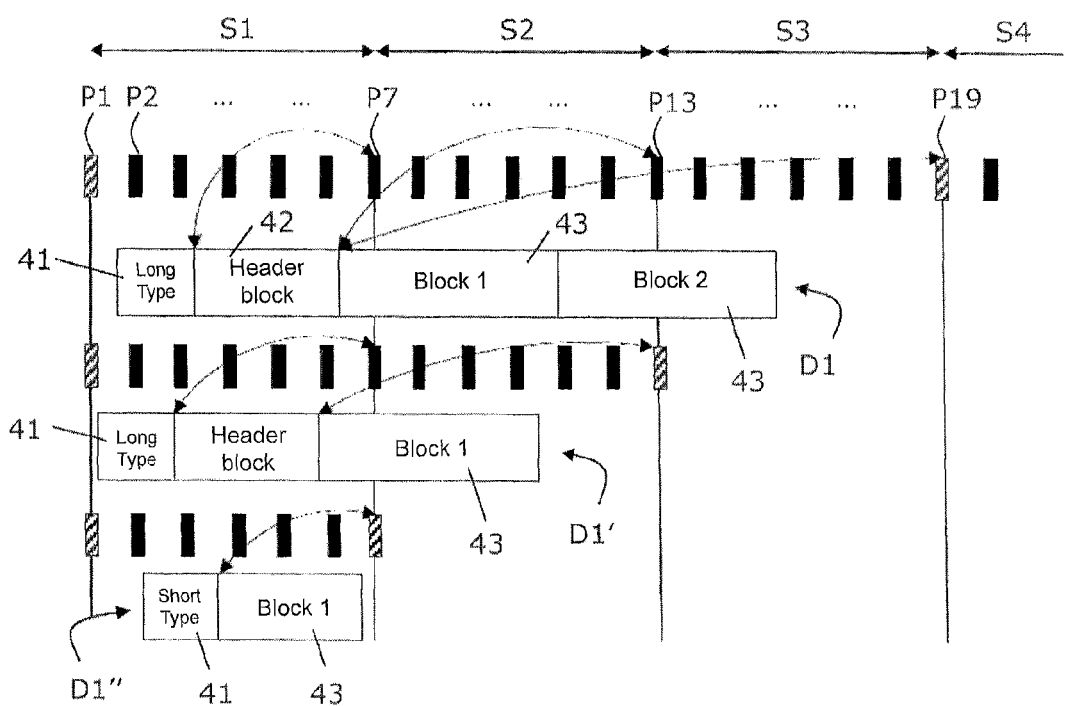
FIG. 5 shows, for three uplink messages of different lengths, a succession of status symbols modified by a second implementation of the method according to an embodiment of the invention.

FIG. 5 shows three examples of implementing the method according to the invention making use of optional step E2. These three examples correspond to messages D1, D1' and D1" of different lengths. The messages D1-D1', at the top of the figure, are of the long type while the message D1", at the bottom, is of the short type. Each message D1-D1" comprises an indicator 41 of the length of the message, followed by a header block 42 when it is of the long type (messages D1-D1'). The messages D1-D1" further comprise one or more data blocks 43. The messages D1-D1" are received in a timeslot S1 and, according to their length, this reception is continued over the timeslots S2-S3. The duration of the timeslots is in this example constant and equal to six microslots. The network infrastructure initially indicates an idle state every six status symbols, which is status symbols P1, P7, P13, P19 . . . .

The step E2 of the management method is advantageously implemented as soon as the indicator 41 (i.e. the very beginning of the message) has been received by the network infrastructure, even before the message is entirely received. In particular, the indicator 41 can be read before the header block 42 is entirely received. The reading of the indicator 41 in the step E2 can include a so-called operation of channel decoding (recovering an error correction code followed by a possible error correction), as soon as the portion of the radio message corresponding to the indicator 41 has been demodulated (the radio demodulation can take place as the message is being received).

When the type of message determined in the step E2 is the short type (message D1"), the status symbol (P7) at the beginning of the following timeslot (S2) is maintained in the idle state.

When the message is of the long type (message D1 or D1'), the network infrastructure modifies the state of the status symbol P7 in order to indicate the busy state. This change is carried out immediately after the decoding of the indicator 41. It is only after the processing of the header block (step E3) that the length of the message and the corresponding number Nb of timeslots are determined, for example from the number of blocks 43. Finally, if the number Nb is greater than or equal to 3, the status symbol (step E4) of the timeslots consecutive to the timeslot at S2 (S3 . . . ) is also modified. By taking into account the length of a block in relation to the length of a timeslot, several status symbols can as such be modified in order to indicate a busy state.

The number of timeslots consecutive to the timeslot S2 of which the status symbol is modified is equal to the number Nb ("total" number of slots corresponding to the length of the message) less 2 (as the status symbol of the timeslot S2 has already been modified and the status symbol of timeslot S1 is not affected).

In sum, the number of timeslots of which the status symbol is modified is equal to the number Nb ("total" number of slots corresponding to the length of the message) less 1.

This recovering of the information in two steps (E2 and E3) guarantees that the status symbol P7 of timeslot S2, consecutive to timeslot S1 of reception of the message, is updated in time. Indeed, if the message were devoid of an indicator and if there is a wait for the reception and the decoding of the header block 42 containing the length of the message, the status symbol P7 would risk not being modified in time (case with message D1 for example), as a time for analysis is necessary in order to recover the length of the message using the header block 42. A collision with another message arriving at the timeslot S2 (signalled as idle) could therefore not be avoided. By way of comparison, the reading of the indicator 41 is simpler and faster. It ends sufficiently early, as the indicator 41 is placed at the very beginning of the message.

The early analysis of the indicator 41 is all the more advantageous that the beginning of a message can be received by the network infrastructure with a variable delay. In the examples in FIG. 5, the message D1 is received later than the message D1'. This delay depends in particular on the nature of the terminals and on their proximity with the closest base station.

The analysis of the header block 43 of the message D1 indicates that the message D1 comprises two data blocks 43. It is calculated that a single additional status symbol P13 must be set to the busy state. The message D1' contains only a single bloc 43, of which the end is received sufficiently ahead of timeslot S3 so that its status symbol P13 is maintained in the idle state.

It can be seen in FIG. 5 that the message D1 terminates shortly after the busy status symbol P13 of timeslot S3. This timeslot S3 is signalled as busy for its entire duration (state unknown for the intermediate status symbols). A non-negligible portion of the timeslot S3 is consequently lost.

In addition to the algorithm for determining the idle or busy states of the status symbols, the network infrastructure can implement a second algorithm that determines at what time the message will end (in light of the instant at which its reception started and its length) and consequently modifies the duration of the timeslots. This allows to optimise the use of the uplink channel, and therefore the bandwidth of the communications network. Thus, in an alternative embodiment of the method according to the invention, the duration of the timeslots is variable and dynamically modified by the network infrastructure.

Figure 6:
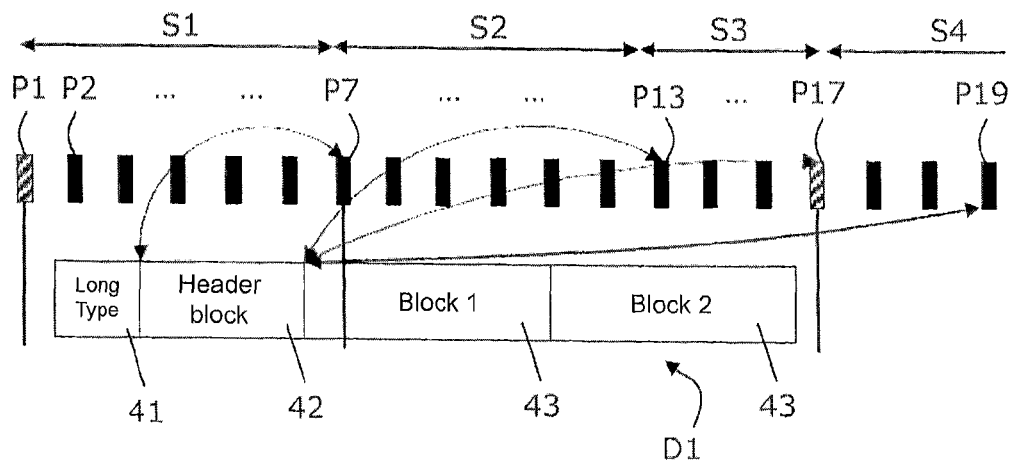
FIG. 6 shows a succession of status symbols modified by a third implementation of the method according to an embodiment of the invention.

FIG. 6 schematically shows this alternative embodiment, by taking the same message D1 as in FIG. 5.

The treatment of the header block 42 allows to calculate that the reception of the uplink message D1 will terminate well before the status symbol P19 initially chosen to indicate the beginning of the new timeslot S4 (S4 is consecutive to S3, cf. FIG. 5). Consequently, rather than validate the idle state of this status symbol P19, the status symbol located immediately after the end of the message D1, here P17, is modified in order to indicate an idle access and the status symbol P19 is on the contrary set to unknown, or busy state. As an idle state marks the beginning of a new timeslot, this has for effect to shorten the timeslot S3 corresponding to the end of the message D1. In other words, the new timeslot S4 is advanced by several microslots (3 microslots in the example of FIG. 6), compared to the "static" embodiment of FIG. 5.

Figure 7:
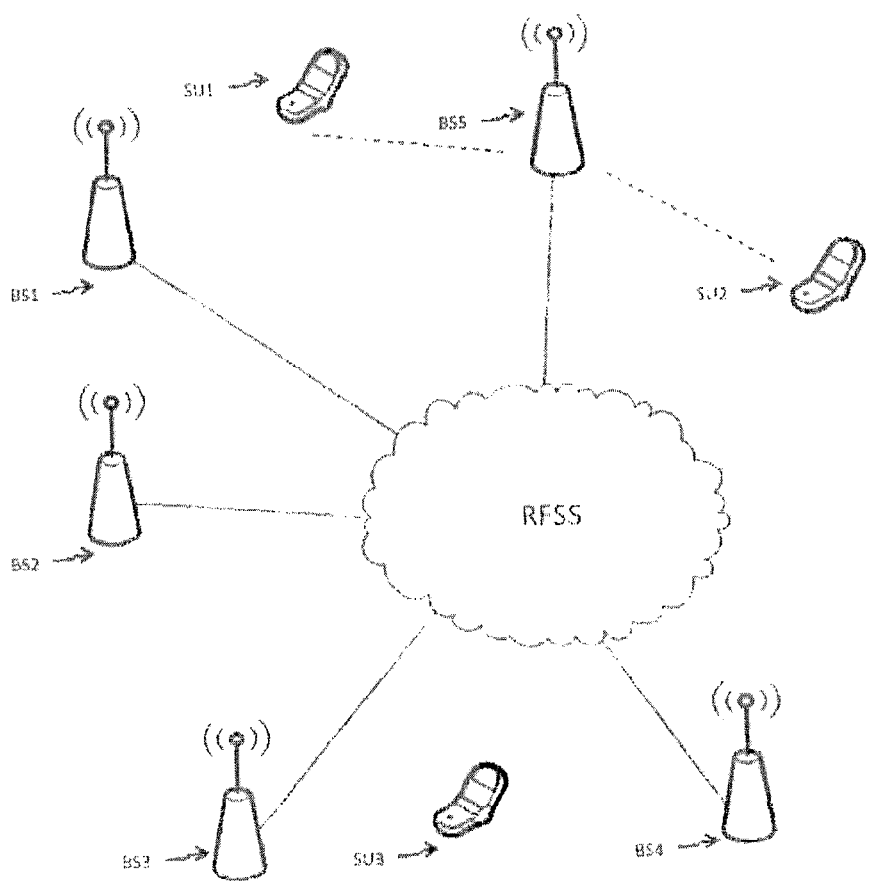
FIG. 7 shows a telecommunications network implementing the method and equipment according to an embodiment of the invention.

FIG. 7 shows a network, of P25 type, implementing an embodiment of the invention. In FIG. 7 are shown three pieces of radio equipment SU1, SU2, SU3. These three pieces of radio equipment are portable mobile radio units. Five base stations BS1, BS2, BS3, BS4 and BS5 (BS) are also shown in FIG. 7.

The radio equipment connects to the various base stations. As shown by a dotted line, the two pieces of radio equipment SU1 and SU2 are connected to the base station BS5. The latter connect to the network infrastructure.

The invention can be implemented solely on the network infrastructure. The utility of this solution is a centralised implementation. However, the delay of reactivity for this implementation of the method is longer if the invention is implemented on each base station.

An embodiment of the invention can therefore be implemented on each base station.

Figure 8:
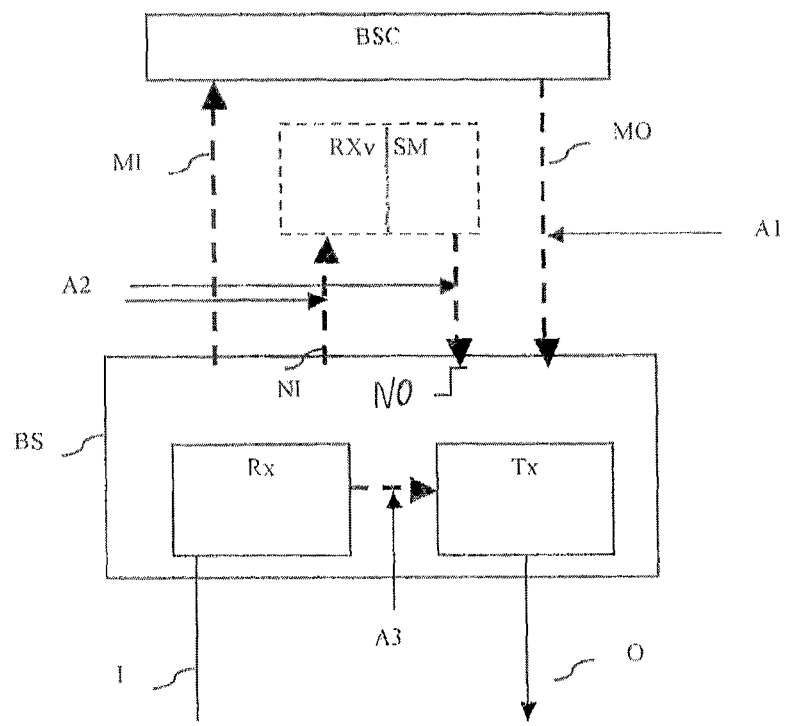
FIG. 8 shows three possible architectures for implementing the invention.

FIG. 8 shows three possible architectures for implementing a method according to the invention.

For the three architectures, an uplink channel message comprising a header block, coming from a piece of radio equipment is received by a receiver Rx of a base station BS. Furthermore, a downlink channel message is emitted by an emitter Tx of the base station BS. This downlink channel message comprises a modification of at least one status symbol of Nb subsequent timeslots determined and sent via the downlink channel O.

In a first architecture A1, the message received by the receiver Rx of the base station generates a message MI sent to a base station controller (BSC). This message MI is then processed by the base station controller BSC. The base station controller BSC then sends a message MO to the base station BS which processes it then emits the downlink channel message via the downlink channel O.

In a second architecture A2 of the simulcast configuration type, the receivers Rx of the base stations each generate a message NI sent to the device RXv, which is a device arranged to select one of the messages NI from among all of the messages NI received from the base stations. The simulcast master SM assisted by the device Rxv processes the message NI and they then send a message NO to the base BS which processes it then emits the downlink channel message via the downlink channel O.

In a third architecture A3, the message received by the receiver Rx of the base station is processed by the base station BS. The base station then emits the downlink channel message via the downlink channel O.

Other architectures are possible. The device SM could be located on the site controller SC, on a specific base station BS or on a dedicated device. The device RXv could be located on the site controller SC, on a specific base station BS or on a dedicated device.

As such, the devices SM and RXv can be co-located. They can also not be co-located. This is shown by the line shown in FIG. 8.

In these various architectures:
  the recovery of the header block can be carried out either:
    by the site controller SC as is the case with the architecture A1, or
    by the device for selecting RXv as is the case with the architecture A2, or
    by the receiving module of the base station, as is the case with the architecture A3.
  the determining of the number Nb of subsequent timeslots corresponding to the determined length L can be carried out either:
    by the site controller SC as is the case with the architecture A1, or
    by the device for selecting RXv as is the case with the architecture A2, or
    by the receiving module of the base station, as is the case with the architecture A3.
  the modifying of at least one status symbol of the Nb subsequent timeslots determined can be carried out either:
    by the site controller SC as is the case with the architecture A1, or
    by the device for selecting SM as is the case with the architecture A2, or
    by the emitting module of the base station, as is the case with the architecture A3.

The invention can also be implemented in a communications network infrastructure with a plurality of pieces of radio equipment, implementing the method for the management of accessibility according to the invention.

The invention can also be implemented by a computer programme that implements the method for managing accessibility according to the invention and is installed in a subsystem of a network infrastructure such as a radio base station or a radio base station controller.

The invention can also be implemented by an electronic module that implements the method for managing accessibility according to the invention. The electronic module can be carried out in the form of a specialised (microelectronic) integrated circuit (ASIC module, for "Application-Specific Integrated Circuit").

Having described and shown the principles of the invention and by referring to the various embodiments, it appears that the various embodiments can be modified in their arrangement and in their detail without moving away from the principles of the invention. It should be understood that the programmes, algorithms, processes or methods described here are not linked or limited to a particular type of computer environment, unless mentioned otherwise. Various types of specialised computer environments can be used to carry out operations according to the teachings described in this document. Elements of embodiments described as being software can be implemented in a hardware manner, and vice versa.

One or several devices, processors or physical processing devices can be configured to execute one or several sequences of one or several machine-executable instructions contained in a main memory in order to implement the method described in this document. The execution of sequences of instructions contained in a main memory brings the processor to carry out at least some of the steps of the method described in this document (for example, the steps of modification, determination, of reading . . . of embodiments of the invention). One or several processors in a multiprocessor configuration can also be used in order to execute the sequences of instructions contained in a main memory. In alternative embodiments, wired circuits can be used instead of software instructions, or in combination with software instructions. Thus, the embodiments are not limited to any specific combination of hardware circuits and software.

Various forms of computer-readable supports can be used for the execution of one or several sequences of one or several instructions in the processor. The term "computer-readable", such as used here, refers to any support participating in providing instructions to a processor for the execution of said instructions. Such a support can take have many forms, including, in a non-limiting manner: non-volatile supports, volatile supports and transmission supports. Non-volatile supports include, for example, optical or magnetic discs. Volatile supports include, for example, dynamic memories. Transmission supports include, for example, coaxial cables, copper wire and optical fibres. The common forms that can be read by a computer include, for example, a diskette, a floppy disc, a hard drive, a magnetic band or any other magnetic support, a CD-ROM, a DVD or any other optical support, perforated cards, paper strips or any other physical support with patterns of holes, a RAM, a PROM, an EPROM, a FLASH-EPROM memory or any other chip or memory cartridge, a carrier wave, and any other support from which a computer can read.

The computer programme comprising machine-executable instructions in order to implement the method (or a portion of the method) according to an aspect of the invention can be implemented by a computer comprising at least one interface, one processor and a non-transient physical memory, also designated generally as being a non-transient computer-readable support or a non-transient storage memory. The computer is a personal computer, given that it is programmed to execute the specific steps of the method described in the present document. The non-transient memory is encoded or programmed with specific instruction code in order to implement the method described in this document and the steps that are associated with it. The non-transient memory communicates with the physical processor in such a way that the physical processor, when it is used, reads and executes the specific instruction codes which are integrated into the non-transient memory. The interface of the personal computer communicates with the physical processor and receives input parameters which are processed by the physical processor.

Those skilled in the art will be able to appreciate that the method described in this document provides a solution to the technical problems described hereinabove.

Of course, the invention is not limited to the examples that have just been described and many arrangements can be made to these examples without exceeding the scope of the invention.

The invention claimed is:
1. A method for managing the accessibility of an uplink channel, of a control channel and/or data channel type, for a communications network infrastructure with a plurality of pieces of radio equipment, in which the accessibility to said uplink channel is transmitted on a downlink channel of said network infrastructure to said pieces of radio equipment by means of status symbols indicating if access to said uplink channel is authorised during a timeslot, the method comprising:
receiving during a first timeslot a message on the uplink channel coming from a piece of radio equipment, said message comprising an indicator in order to indicate a length type of said message followed, when said message is of the long type, by a header block,
reading of said indicator indicating the type of length and, when said message is of the long type:
modifying a status symbol of a second timeslot consecutive to the first timeslot to indicate a busy state;
determining the length of said message received using a processing of the header block;
determining a number Nb of total timeslots corresponding to said determined length;
and if the number Nb of total timeslots is greater than or equal to 3:
modifying a status symbol of the Nb−2 timeslots consecutive to the second timeslot to indicate a busy state.

2. The method according to claim 1, wherein the duration of a timeslot is set and defined by the network infrastructure.

3. The method according to claim 2, wherein the network infrastructure indicates the duration of a timeslot on the control channel by a state every N status symbols, said state being either idle in order to indicate to a piece of radio equipment that it can emit a message on the uplink channel, or busy in order to indicate to said radio equipment that it cannot emit on the uplink channel, the N−1 intermediate status symbols indicating an unknown state.

4. The method according to claim 1, wherein the duration of a timeslot is variable and dynamically modified by the network infrastructure.

5. The method according to claim 4, further comprising calculating an end of reception of said message from the length of said message and modifying the duration of the timeslot corresponding to the end of reception of said message, in such a way as to begin a new timeslot immediately after the end of reception of said message.

6. The method according to claim 1, comprising sending by a piece of radio equipment an uplink message that is longer than the duration of a timeslot, wherein said piece of radio equipment begins the emission of said uplink message on the first timeslot and continues its emission on timeslots consecutive to said first timeslot.

7. The method according to claim 1, comprising a step wherein the network infrastructure is waiting for a message on the uplink channel.

8. The method according to claim 1, wherein determining the length of the message is arranged to determine the length of a message in a data protocol implementing a header block whose a field indicates the total length of the message.

9. The method according to claim 1, wherein determining the length of the message is arranged to determine the length of a message constituted of blocks, by reading a field within a header block.

10. The method according to claim 1, wherein the number Nb of total timeslots is determined by calculating:

$$Nb = \left\lceil \frac{L/\Delta}{N*7.5} \right\rceil$$

where L is the length in bits of the message D, Δ the rate in bits per milliseconds of reception of this message, N the number of micro-timeslots per timeslot and 7.5 the duration in milliseconds of a microslot and where ⌈x⌉ designates the integer greater than or equal to x.

11. A communications network infrastructure with a plurality of pieces of radio equipment, implementing the method for managing accessibility according to claim 1.

12. A non-transitory computer readable medium comprising a computer program including instructions for implementing the method for managing accessibility according to claim 1, installed in a subsystem of a network infrastructure.

13. An electronic module implementing the method for managing accessibility according to claim 1.

14. The non-transitory computer readable medium according to claim 12, wherein the subsystem of the network infrastructure is a radio base station or a radio base station controller.

* * * * *